United States Patent
Spiess

[11] Patent Number: 6,089,264
[45] Date of Patent: Jul. 18, 2000

[54] FLOW METER

[75] Inventor: Fritz Spiess, Unterlunkhofen, Switzerland

[73] Assignee: FS Engineering Fritz Spiess, Unterlunkhofen, Switzerland

[21] Appl. No.: 09/093,389

[22] Filed: Jun. 6, 1998

[30] Foreign Application Priority Data

Jun. 11, 1997 [CH] Switzerland .............................. 1413/97

[51] Int. Cl.[7] .............................. F16K 37/00; F17D 3/18; F17D 3/01
[52] U.S. Cl. .............................. 137/559; 137/557
[58] Field of Search .............................. 137/559, 552, 137/556.3, 556, 557; 73/861.74, 861.71

[56] References Cited

U.S. PATENT DOCUMENTS

| 2,891,570 | 6/1959 | Krupp | ..................................... 137/559 |
| 3,881,354 | 5/1975 | Block | ..................................... 73/861.71 |

FOREIGN PATENT DOCUMENTS

| 369150 | 12/1982 | Austria . |
| 35 09 718 | 9/1986 | Germany . |
| 3515752 | 11/1986 | Germany . |
| 369150 | 3/1994 | Germany . |
| 1401614 | 7/1971 | United Kingdom . |
| 1401614 | 7/1975 | United Kingdom . |
| 1 477 530 | 6/1977 | United Kingdom . |

*Primary Examiner*—Denise L. Ferensic
*Assistant Examiner*—Kenneth B. Rinehart
*Attorney, Agent, or Firm*—Browdy and Neimark

[57] ABSTRACT

A flow meter, such as is used in warm water heating systems, has a measuring element (2) with a flow-responsive element and a display element (3) with a transparent inspection glass or tube (10) with a bore in which an an end of an indicator rod (6) moves. The indicator rod is part of, or is coupled to, the flow-responsive element and it has a pointer (8) near the end inside the inspection tube. The inspection tube preferably has no markings: instead, around the inspection tube is a scale support (16) with scale markings calibrated to the positions of the pointer (8) to show the amount of flow. The scale support is essentially sleeves-shaped, with a lateral cutout (18) which permits the user to view the pointer inside the inspection tube. The scale markings may be on cut surfaces (20) adjoining the lateral cutout. In one embodiment the scale support is rotatable about the inspection tube for adjusting the viewing angle, so that it is not necessary to take the rotational position of the inspection tube into consideration when the flow meter is installed. In an alternative embodiment the inspection tube is combined with a valve for adjusting the measured flow.

19 Claims, 2 Drawing Sheets

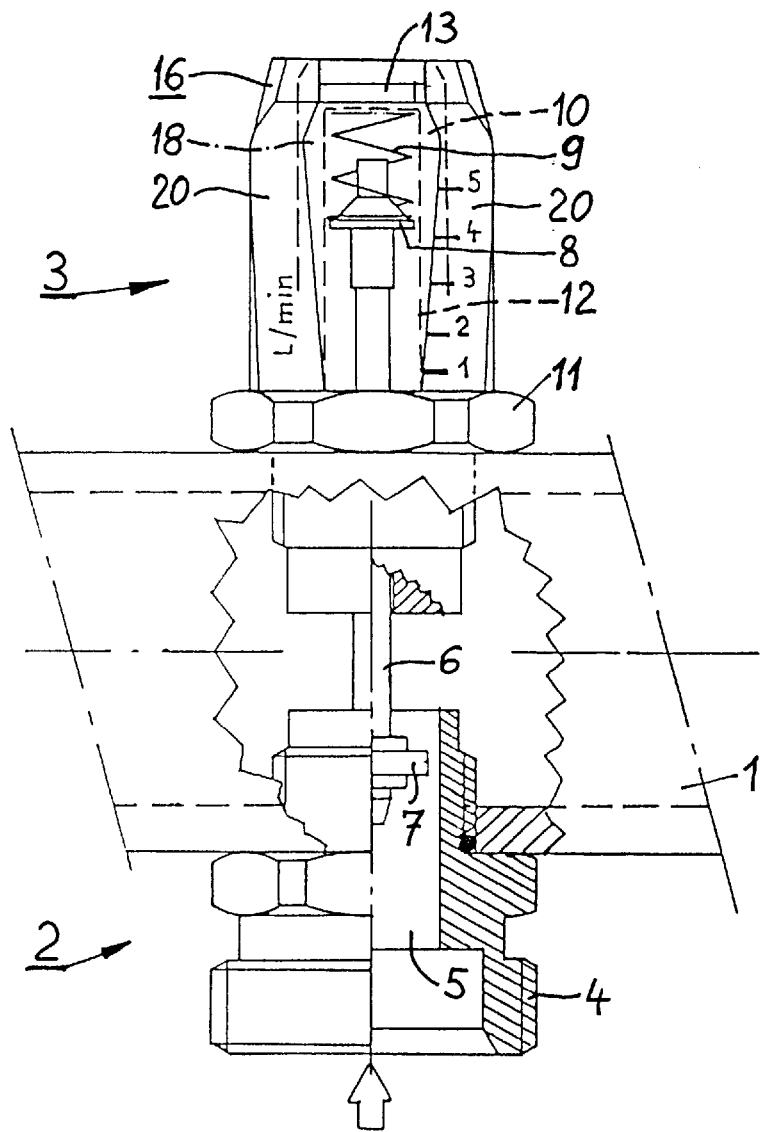
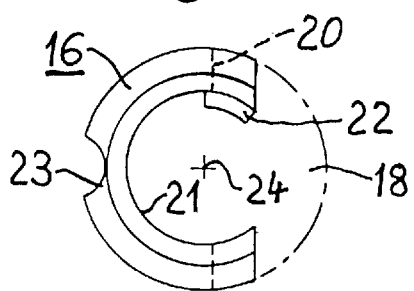
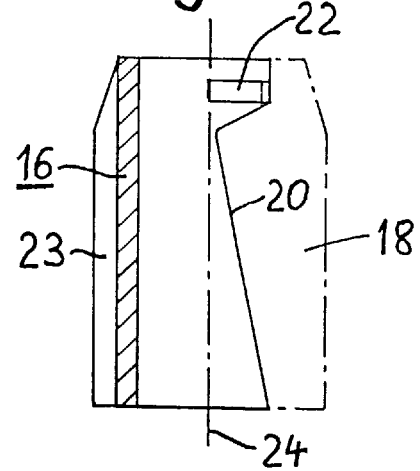

FLOW METER

FIELD OF THE INVENTION

The invention relates to a flow meter, in particular for warm water heating systems, with a measuring element and a display element with a transparent, tube-shaped inspection glass, in whose bore an indicator rod which is connected with the measuring element is movably guided.

REVIEW OF THE RELATED TECHNOLOGY

Flow meters of this type for flowing liquids are often installed in connection with warm water heating systems so as to be able to indicate the selected partial flows of the heating medium in the various conduit trains, or respectively branch lines, and to monitor them during operation. In known embodiments of such flow meters the indicator scale from which the respective position of the indicator rod can be read off is applied as a line on the surface of the inspection glass, However, here it is not always assured that the scale on the inspection glass (which customarily extends vertically from the conduit pipe) can be comfortably read, since during the assembly of the flow meter the rotational position of the inspection glass is undetermined, or respectively the scale is not oriented in the desired viewing direction. This is particularly disturbing it several flow meters for the individual branch lines are arranged next to each other on a flow distribution pipe or return collector pipe. Although it is possible to apply the scale lines so they circle the inspection glass, wherein several rows of associated numbers are required on the circumference, this step requires a not inconsiderable effort for applying the numbers, either by means of the injection molding process or by marking the circumferential surface.

SUMMARY OF THE INVENTION

Accordingly, the present invention has an object, among others, to overcome deficiencies in the prior art such as noted above.

It is the object of the invention to remove the disadvantages in connection with known flow meters and achieve a construction which assures perfect and easy reading of the measurement values in any installation situation.

This object is attained by means of the invention in that an essentially sleeve-shaped scale support is arranged around the inspection tube which is axially fixed in place in respect to the inspection tube, but can be rotatingly adjusted and has a lateral cutout, which exposes the view on the inspection tube and the indicator rod, wherein the cut surfaces of the cutout have scale markings next to the inspection tube.

Such a scale support can be simply and cost-effectively manufactured in different suitable variations. By adjusting its rotational position on the finished, assembled flow meter it is possible to achieve optimal readability in every installation situation, even in crowded space situations. Since now the inspection tube itself no longer needs to be marked, it can be manufactured with reduced outlay.

BRIEF DESCRIPTION OF THE DRAWING

The above and other objects and the nature and advantages of the present invention will become more apparent from the following detailed description of exemplary embodiments taken in conjunction with drawings, wherein:

FIG. 1 is an elevational or lateral view, partially in section and partially cut away, of a flow meter in accordance with a first embodiment of the present invention, mounted on a collector pipe;

FIG. 2 is a plan view along the axis of the scale support in FIG. 1;

FIG. 3 is cross-sectional view along lines III—III of FIG. 2;

DETAILED DESCRIPTION OF THE PREFERRED EMBODIMENT

Figure 4:
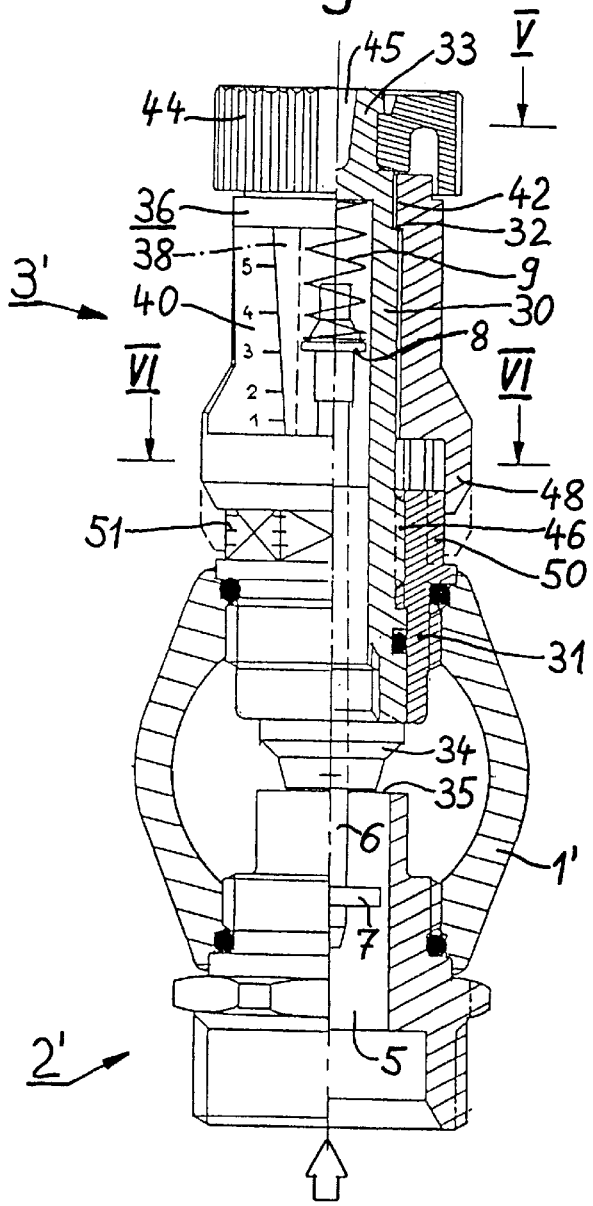
FIG. 4. is a representation of a second exemplary embodiment of the present invention, similar to the view of FIG. 1 but with the paper perpendicular to longitudinal axis of a collector pipe; the left half being an elevational view and the right half being a vertical section on a plane outward from the central axis.

FIG. 1 shows the flow meter of the present invention, shown by way of example, consisting of a measuring element 2 and display element 3, mounted on the return collector pipe 1 of a warn water heating system. It measures the flow in accordance with the direction of the arrow A in the return of an individual branch line. Several such flow meter for different branch lines are typically arranged next to each other on the collector pipe 1. The measuring element 2, which is tightly screwed into the collector pipe 1, has an external screw thread for connecting a return line (not represented). In a known manner, a rebounding plate 7 supported by an indicator rod is located in the measuring bore 5. The position of the plate 7 along the measuring bore is clearly a function of the respective flow-through.

The indicator element 3 is mounted opposite the measuring element on the top of the collector pipe 1. It has a guide element 11, which is tightly screwed together with the pipe 1 and supports the tube-shaped inspection tube 10 made of a transparent material. The indicator rod 6 is slidingly guided in a longitudinal bore of the guide element 11. On its upper end it supports the disk-shaped pointer 8, which slides up and down in the bore 12 of the inspection tube, The restoring spring 9 is supported between the bottom of the bore 12 and the pointer 8, or respectively the indicator rod. The basic construction and the mode of functioning of such a flow meter are known to those skilled in the art and need not be described further.

As can be seen from FIG. 1, the inspection tube 10 itself does not have a scale to be read, Instead a separate, essentially sleeve-shaped scale support 16 with a longitudinal axis 24 is provided, which is arranged around the inspection tube and has a lateral cutout 18. The shape of the scale support 16 in accordance with FIG. 1 is represented in detail in FIGS. 2 and 3, wherein the "supplemented" sleeve shape is indicated in dash-dotted lines. (The "supplemented" shape is the shape which the sleeve would have without the cut-out 18, i.e., a figure of revolution about the axis 24, in the preferred embodiment,) The cutout 18 permits the view of the inspection tube 10 and the indicator rod 6 with the pointer 8 laterally over a defined angular area, Cut surfaces 20, present because of the cutout 18, which adjoin the inspection glass 10, have scale markings from which the pointer position, or respectively the flow-through value, can be read off. The terms "Cutout" and "Cut surfaces" used here should, of course, be understood in a purely geometric sense in respect to the shape of the sleeve; it is of course possible to produce the scale support 16 as a finished element without a cutting process, for example from plastic in accordance with the injection molding process, wherein the application of the markings in the same work process presents no difficulties.

The scale support 16 is axially positioned in respect to the inspection glass 10, but can be adjusted in its rotational position. In accordance with the represented example, the inspection glass has a circumferential annular groove 13 near its upper end for this purpose. This is engaged by a cam 22 of the scale support, which protrudes from its interior surface 21 (which corresponds to the diameter of the inspection glass). The scale support, which is cut along its entire height, is resilient in diameter, aided by a longitudinal groove 23 located opposite the cutout 18. During assembly the scale support can be simply pushed on the inspection tube from above (axially). The cam 22 slides last over the slightly beveled and of the inspection tube and then snaps into the annular groove 13.

When the indicator element 3 of the flow meter is mounted opposite the measuring element 2, it is not necessary to take the rotational position resulting during the tightening of the guide element 11 into consideration, because afterward the scale support 16 can be easily brought into the rotational position suitable for reading the scale and corresponding to the installation conditions, It may be advantageous if the cut surfaces 20 with the scale markings are inclined with respect to the longitudinal axis 24, as can be clearly seen in FIG. 3. The cut surfaces 20 on both sides need not be located in the same plane, but contrary to the example shown, they can also be inclined toward each other, for example oriented approximately radially toward the axis 24.

Flow meters of this type can of course also be operated with the reverse flow direction in the measuring pipe 5; an arrangement similar to the one in FIG. 1 then is mounted, for example, on the flow distribution pipe of a heating installation, wherein a flow branch line is connected to the threaded connector 4. Since in this case the flow acts from above on the rebounding plate 7, a scale support 16 is used, whose scale extends, contrary to FIG. 1, from the top to the bottom, and the restoring spring 9 must be inserted below the pointer 8 and supported on the bottom on the guide element 11.

Figure 5:
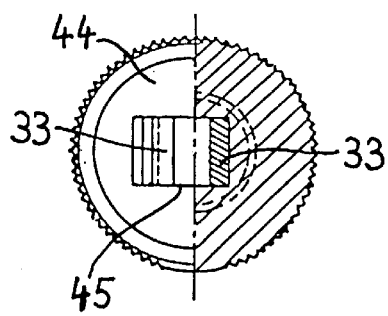
FIG. 5, a view looking along the axis, is a plan view on the left and on the right is a sectional view taken on line V of FIG. 4.
Figure 6:
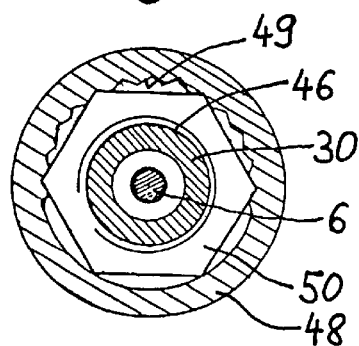
FIG. 6 is a cross-sectional view taken. on lines VI—VI of FIG. 4.

In connection with a further exemplary embodiment of a flow meter in accordance with FIGS. 4, 5 and 6, the measuring element 2' and the indicator element 3' are again mounted on a return collector pipe 1'. Elements 5 to 9 in FIG. 4 essentially correspond to the elements of the previous example provided with the same reference numerals, and the mode of functioning of the flow meter is basically the same as described above and known. However, in the instant case the flow meter is structurally combined with an adjusting valve (with a valve gasket, or, locking body 34 and a valve seat 35) for the flow to be measured.

Again the guide element 31 of the indicator element 3' is tightly screwed together with the pipe 1' and tightened by means of a hexagon nut 50. However, the inspection tube 30 is not rigidly connected with the guide element 31, instead it is embodied as a rotatable ascending spindle and has the valve locking body or gasket 34 at the lower end. The spindle screw thread (exterior screw thread on the inspection tube 30, interior screw thread on the guide element 31) is identified by 46. A knurled ring 44 is used for the rotational adjustment of the spindle, or respectively the inspection glass about the axis 24'. It has a centered, for example rectangular or square recess 45, which is engaged by two resilient tabs 33, which protrude from the upper end of the inspection tube 30 for snap-fastening the ring 44.

The approximately sleeve-shaped scale support 36 surrounding the inspection tube 30 is also designed in a manner differing from the previous exemplary embodiment. A lateral cutout 38, which permits viewing the inspection tube and the indicator rod, has cut surfaces 40 (inclined, for example) on which the scale markings are placed. The cutout 38 does not extend over the entire height of the scale support 36, instead it leaves circumferential closed ring sections at the top and bottom. An upper, radially inwardly projecting section 42 on the scale support rests on a radial shoulder 32 on the inspection tube 30. The ring 44 furthermore projects over the upper end of the scale support 36. In this way the scale support is axially fixed in place, but rotatably guided on the inspection tube. The scale support is widened in the shape of a bell on the bottom at 48 and provided with teeth 49 on the interior, which extend over the hexagon nut 50 of the guide element 31.

If now the ascending inspection tube spindle 30 is turned by means of the ring 44 in order to adjust the flow (which is simultaneously measured and displayed) by means of the valve 34, 35, the scale support 36 is axially displaced along with the spindle, but remains in its rotational position. A rotation orientation, which is suitable for optimal reading of the scale and is adapted to the installation situation, is set during mounting of the flow meter as long as the ring 44 has not yet been snapped on and as long as the teeth 49 can be turned over the hexagon nut 50 when the scale support is lifted. The scale support then maintains the set orientation during operation.

An auxiliary scale 51 applied to the hexagonal nut 50 can be seen in FIG. 4, whose graduation corresponds to the pitch of the screw thread 46 and which can be created, for example, by notching the corners of the hexagon nut. By means of the scale 51 the respective position of the valve 34, 35 can be read off, at least approximately, from the position of the lower edge of the section 48 extending over the hexagon nut 50.

In one alternative embodiment (not shown) the scale support may comprise a transparent tube section, preferably cylindrical, without any cutout. With this tube section the pointer 8 is visible through walls of both the inspection glass 10 and the scale support. The flow-calibrated markings may then be made on the surface of the tube section.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means and materials for carrying out various disclosed functions may take a variety of alternative forms without departing from the invention.

Thus the expressions "means to . . . " and "means for . . . " as may be found in the specification above and/or in the claims below, followed by a functional statement, are intended to define and cover whatever structural, physical, chemical or electrical element or structure may now or in the future exist which carries out the recited function, whether or not precisely equivalent to the embodiment or embodiments disclosed in the specification above; and it is intended that such expressions be given their broadest interpretation.

What is claimed is:

1. A flow meter comprising:
 a display element (3, 3') further including a transparent, generally tube-shaped inspection glass (10, 30) and including a bore (12) having a generally longitudinal axis (24);
 an indicator rod (6) being at least partially disposed within the bore and axially movable therein;
 the indicator rod (6) being connected to a measuring element (2, 2') and axially movable according to the flow;
 an essentially sleeve-shaped scale support (16, 36), disposed around the inspection glass (10, 30);
 the scale support being axially fixed in place with respect to the inspection glass;
 the scale support including a lateral cutout (18, 38) which exposes the inspection glass and the indicator rod therein to view;
 the lateral cutout comprising cut surfaces (20, 40) adjacent the inspection glass (10, 30); and
 the cut surfaces including scale markings calibrated to the flows;
 wherein the scale support is adjustable rotatable generally about the axis relative to the inspection glass.

2. The flow meter in accordance with claim 1, wherein the scale support comprises a radially inwardly protruding section (22, 42) and the inspection glass (10, 30) includes a circular feature on which the radially inwardly protruding section is slidingly guidable.

3. The flow meter in accordance with claim 2, wherein the circular feature includes an annular groove (13).

4. The flow meter in accordance with claim 2, wherein the circular feature includes a circumferential radial shoulder (32).

5. The flow meter in accordance with claim 2, wherein the scale support (16) is cut over an entire height thereof on a side, whereby a diameter of the scale support is resilient and the scale support is snappable onto the inspection glass (10).

6. The flow meter in accordance with claim 1, wherein the cut surfaces (20, 40) on the scale support are inclined with respect to the axis (24).

7. The flow meter in accordance with claim 1, wherein:
 the flow meter further comprises a stationary guide element (31);
 the display element further comprises an axially-movable spindle including a spindle end facing the measuring element (2');
 the measuring element includes a valve seat (35) and the spindle end includes a valve gasket (34) axially engageable with the valve seat, whereby the flow meter comprises a valve (34, 35) controlling the measured flow.

8. The flow meter in accordance with claim 7, wherein the axially-movable spindle comprises the inspection glass.

9. The flow meter in accordance with claim 7, wherein the axially-movable spindle is rotatably and ascendingly seated in the stationary guide element (31).

10. The flow meter in accordance with claim 9, wherein the axially-movable spindle includes an exterior screw thread (48) and the guide element includes an interior screw thread (46) matable therewith.

11. The flow meter in accordance with claim 7, wherein the scale support (36) is guidable on the guide element to be axially displaceable with the axially-movable spindle.

12. The flow meter in accordance with claim 11, wherein a rotational position of the scale support (36) is adjustable.

13. The flow meter in accordance with claim 12, wherein a rotational position of the scale support (36) is clamapable into one rotational position.

14. A method comprising using the flow meter of claim 1 in a warm water heating system.

15. In a flow meter for indicating a measured flow, the flow meter being of the type having:
 a transparent inspection glass (10, 30) having a bore (12);
 a pointer (8) disposed in the bore; and
 a measuring element (2, 2') coupled to the pointer whereby the pointer is axially movable in the bore according to the measured flow;
 the improvement comprising:
 an essentially sleeve-shaped scale support (16, 36) is disposed around the inspection glass (10, 30) and the scale support includes scale markings calibrated to the flow;
 the inspection glass lacking any scale markings; and
 wherein the scale support is rotatable adjustable about a longitudinal axis of the bore relative to the inspection glass and axially fixed in place with respect to the inspection glass.

16. The improvement in accordance with claim 15, wherein:
 the scale support includes a lateral cutout (18, 38) which exposes the inspection glass and the indicator rod therein to view,
 the lateral cutout comprises cut surfaces (20, 40) adjacent the inspection glass (10, 30); and
 the cut surfaces comprise the scale markings.

17. The improvement in accordance with claim 15, wherein the measuring element (2, 2'), the transparent inspection glass (10, 30), and the scale support (16, 36) are:
 substantially fixed relative to one another in a direction generally parallel to the longitudinal axis; and
 movable in the direction as a unit.

18. A flow meter comprising:
 a display element (3, 3') further including a transparent, generally tube-shaped inspection glass (10, 30) and including a bore (12) having a generally longitudinal axis (24);
 an indicator rod (6) being at least partially disposed within the bore and axially movable therein;
 the indicator rod (6) being connected to a measuring element (2, 2') and axially movable according to the flow;
 an essentially sleeve-shaped scale support (16, 36), disposed around the inspection glass (10, 30);
 the scale support being axially fixed in place with respect to the inspection glass;
 the scale support including a lateral cutout (18, 38) which exposes the inspection glass and the indicator rod therein to view;
 the lateral cutout comprising cut surfaces (20, 40) adjacent the inspection glass (10, 30); and
 the cut surfaces including scale markings calibrated to the flow;
 wherein the scale support comprises a radially inwardly protruding cam (22) and the inspection glass (10, 30) includes a circular feature on which the radially inwardly protruding cam is slidingly guidable.

19. A flow meter comprising:
 a display element (3, 3') further including a transparent, generally tube-shaped inspection glass (10, 30) and including a bore (12) having a generally longitudinal axis (24);

an indicator rod (6) being at least partially disposed within the bore and axially movable therein;

the indicator rod (6) being connected to a measuring element (2, 2') and axially movable according to the flow;

an essentially sleeve-shaped scale support (16, 36), disposed around the inspection glass (10, 30);

the scale support being axially fixed in place with respect to the inspection glass;

the scale support including a lateral cutout (18, 38) which exposes the inspection glass and the indicator rod therein to view;

the lateral cutout comprising cut surfaces (20, 40) adjacent the inspection glass (10, 30); and the cut surfaces including scale markings calibrated to the flow;

wherein the scale support a comprises a radially inwardly protruding section (22, 42) and the inspection glass (10, 30) includes a circular feature on which the radially inwardly protruding section is slidingly guidable; and wherein the circular feature includes a circumferential radial shoulder (32).

* * * * *